(12) United States Patent
Humbert et al.

(10) Patent No.: US 11,708,024 B2
(45) Date of Patent: Jul. 25, 2023

(54) DYNAMIC IMAGING SYSTEM

(71) Applicant: GENTEX CORPORATION, Zeeland, MI (US)

(72) Inventors: Thomas E. Humbert, Zeeland, MI (US); Leah R. Hoffmeyer, Holland, MI (US); David M. Falb, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 11 days.

(21) Appl. No.: 17/141,320

(22) Filed: Jan. 5, 2021

(65) Prior Publication Data

US 2021/0209725 A1    Jul. 8, 2021

Related U.S. Application Data

(60) Provisional application No. 62/985,367, filed on Mar. 5, 2020, provisional application No. 62/957,473, filed on Jan. 6, 2020.

(51) Int. Cl.
*G09G 5/00* (2006.01)
*B60R 1/00* (2022.01)
(Continued)

(52) U.S. Cl.
CPC .............. *B60R 1/00* (2013.01); *G06T 3/0093* (2013.01); *G06T 3/4038* (2013.01);
(Continued)

(58) Field of Classification Search
CPC ... G06T 2210/44; G06T 3/0093; G06T 13/00; G06T 13/80; G06T 13/20
(Continued)

(56) References Cited

U.S. PATENT DOCUMENTS

2005/0206510 A1\*  9/2005  Weber ...................... B60R 1/00
                                                                  348/148
2009/0096937 A1    4/2009  Bauer et al.
(Continued)

OTHER PUBLICATIONS

International Search Report dated Apr. 15, 2021, for corresponding PCT application No. PCT/US2021/012138, 2 pages.
Written Opinion dated Apr. 15, 2021, for corresponding PCT application No. PCT/US2021/012138, 5 pages.

*Primary Examiner* — Gordon G Liu
(74) *Attorney, Agent, or Firm* — Price Heneveld LLP; Brian James Brewer

(57) ABSTRACT

A dynamic imaging system is disclosed. The dynamic imaging system may comprise one or more imager, one or more input device, a controller, and/or a display. Each imager may be operable to capture a video stream having a field of view. In some embodiments, the controller may articulate the imager or crop the field of view to change the field of view in response to signals from the one or more input devices. For example, the signal may relate to the vehicle's speed. In other embodiments, the controller may apply a warp to the field of view. The warp may be applied in response to signals from the one or more input devices. In yet other embodiments, video streams from one or more imagers may be stitched together by the controller. Further, the controller may likewise move the stitch line in response to signals from the or more input devices.

17 Claims, 12 Drawing Sheets

(51) Int. Cl.
    *G06T 3/00*     (2006.01)
    *G06T 3/40*     (2006.01)
    *G06V 20/58*     (2022.01)
    *G06V 10/80*     (2022.01)
    *G06V 20/56*     (2022.01)

(52) U.S. Cl.
    CPC ............ *G06V 10/803* (2022.01); *G06V 20/56* (2022.01); *G06V 20/58* (2022.01); *B60R 2300/202* (2013.01); *B60R 2300/302* (2013.01); *B60R 2300/802* (2013.01); *B60R 2300/8066* (2013.01)

(58) Field of Classification Search
    USPC ......................................................... 345/646
    See application file for complete search history.

(56) References Cited

U.S. PATENT DOCUMENTS

| | | |
|---|---|---|
| 2010/0020170 A1 | 1/2010 | Higgins-Luthman et al. |
| 2010/0201816 A1 | 8/2010 | Lee et al. |
| 2015/0210274 A1* | 7/2015 | Clarke .................. G08G 1/165 382/104 |
| 2016/0044284 A1* | 2/2016 | Goseberg ................. B60R 1/00 348/148 |
| 2016/0137126 A1 | 5/2016 | Fürsich et al. |
| 2017/0174227 A1 | 6/2017 | Tatourian et al. |
| 2019/0082157 A1 | 3/2019 | Pflug |
| 2020/0074735 A1* | 3/2020 | Nowakowski .......... G06T 11/60 |
| 2020/0247319 A1* | 8/2020 | Shimizu .................. G08G 1/16 |

* cited by examiner

DYNAMIC IMAGING SYSTEM

CROSS-REFERENCE TO RELATED APPLICATIONS

This application claims priority under U.S.C. § 119(e) to U.S. provisional Application No. 62/957,473 filed on Jan. 6, 2020, entitled "DYNAMIC IMAGING SYSTEM," and U.S. provisional Application No. 62/985,367 filed on Mar. 5, 2020, entitled "DYNAMIC IMAGING SYSTEM," the disclosures of which are hereby incorporated by reference in their entireties.

FIELD OF INVENTION

The present invention relates in general to imaging systems and, more particularly, to dynamic imaging systems responsive to signals from one or more inputs.

BACKGROUND OF INVENTION

Imaging systems on vehicles have been well known for many years. However, while these imaging systems have proved to be useful, they are not perfect. For example, current vehicle imaging systems often encounter the problem of blur at high speeds, gaps in fields of view, and fields of view that may make other vehicles appear to have rear-ended you when stopped at a light. Accordingly, there is a need for improved imaging systems.

Additionally, the use of multiple imagers has been incorporated into imaging systems. In some instances, the video streams from the imagers are stitched together to create a composite video stream for display. However, while these stitched composite video streams are useful, objects disposed along the stitching line may appear distorted or in some instances disappear altogether. Accordingly, there is a need for improved image stitching systems.

SUMMARY

According to one aspect of the present disclosure, an imaging system is disclosed. The imaging system may include an imager, an input device, a controller, and/or a display. The imager may be operable to capture a first video stream having a first field of view. Further, the first video stream may be of a scene exterior a vehicle. The input device may be operable to provide an input signal. In some embodiments, the input device may be a speed detector and the input signal may correspond to a speed of the vehicle. Additionally, the input device may be operable to determine the vehicle's direction of travel and the input signal may, accordingly, correspond to the direction of travel. In other embodiments, the input device may be a blind spot detector and the input signal may, accordingly, correspond to a detection of an object. The controller may be communicatively connected to the imager and the input device. Further, the controller may be operable to produce a second video stream. The second video stream may have a second field of view based, at least in part, on the input signal. In some embodiments, the horizontal angle of the second field of view may narrow based, at least in part, on increasing vehicle speed. For example, the horizontal angle may be less than or equal to approximately 59, 55, 51, 47, 42, 38, 34, and 30 degrees when the vehicle speed is greater than or equal to approximately 0, 5, 10, 20, 30, 40, and 50 mph, respectively. In some additional embodiments, the production of the second view stream may be manually over-ridden. Further, the manual over-ride may correspond to manually selecting a horizontal angle of the second field of view. Lastly, the display may be communicatively connected to the controller and operable to display the second video stream.

In some embodiments, the first field of view may have a first vertical pitch. Likewise, the second field of view may have a second vertical pitch. The first and second vertical pitches may be different. Further, they may be different based, at least in part, on the vehicle's speed. In other embodiments, they may be different based, at least in part, on the vehicle's direction of travel.

In some embodiments, the first field of view may have a first horizontal yaw, Likewise, the second field of view may have a second horizontal yaw. The first and second horizontal yaws may be different. Further, they may be different based, at least in part, on the detection of the object.

In some embodiments, the first field of view may have a first horizontal view angle. Likewise, the second field of view may have a second horizontal field of view angle. The first and second horizontal field of view angles may be different. Further, they may be different based, at least in part, on the input signal.

In some embodiments, the controller may be further operable to objects at least part of a periphery of the first field of view. Accordingly, the second field of view may be defined based, at least in part, on the obscured portion of the periphery.

According to another aspect of the present disclosure, a dynamic display device is disclosed. The dynamic display device may include a display and a controller. The display may be operable to display a second video stream. The controller may be operable to receive a first video stream having a first field of view from an imager and receive an input signal from an input device. The first field of view may capture at least part of a scene rearward relative to a vehicle in which the display device may be disposed. Additionally, the input device may be a speed detector. Further, the controller may be operable to produce the second video stream having a second field of view. The second video stream may be based, at least in part, on the first video stream. Further, the second field of view may be based, at least in part, on the input signal. In some embodiments, the horizontal angle of the second field of view may narrow based, at least in part, on increasing vehicle speed. For example, the horizontal angle may be less than or equal to approximately 59, 55, 51, 47, 42, 38, 34, and 30 degrees when the vehicle speed is greater than or equal to approximately 0, 5, 10, 20, 30, 40, and 50 mph, respectively. In some additional embodiments, the production of the second view stream may be manually over-ridden. Further, the manual over-ride may correspond to manually selecting a horizontal angle of the second field of view. Furthermore, this second video stream may be communicated to the display.

In some embodiments, the first field of view may have a first vertical pitch. Likewise, the second field of view may have a second vertical pitch. The first and second vertical pitches may be different. Further, they may be different based, at least in part, on the vehicle's speed. In other embodiments, they may be different based, at least in part, on the vehicle's direction of travel.

In some embodiments, the first field of view may have a first horizontal yaw, Likewise, the second field of view may have a second horizontal yaw. The first and second horizontal yaws may be different. Further, they may be different based, at least in part, on the detection of the object.

In some embodiments, the first field of view may have a first horizontal view angle. Likewise, the second field of view may have a second horizontal field of view angle. The first and second horizontal field of view angles may be different. Further, they may be different based, at least in part, on the input signal.

In some embodiments, the controller may be further operable to objects at least part of a periphery of the first field of view. Accordingly, the second field of view may be defined based, at least in part, on the obscured portion of the periphery.

According to another aspect of the present disclosure, a stitched imaging system is disclosed. The stitched imaging system may include a first imager, a second imager, a speed detector a controller, and/or a display. The first imager may be operable to capture a first video stream of a scene exterior a vehicle. Further, the first video stream may have a first field of view. The second imager may be operable to capture a second video stream of the scene. Likewise, the second video stream may have a second field of view, which overlaps with the first field of view to define an overlapping region. The speed detector may be operable to determine the speed of the vehicle. The controller may be communicatively connected to the first imager, the second imager, and the speed detector. Additionally, the controller may be operable to produce a composite video stream by cropping at least one of the first and second video streams along a stitch line in the overlapping region of at least one of the first and second fields of view, and by further disposing the first and second video streams adjacent one another in abutting contact. The display may be communicatively connected to the controller to receive and display the composite video stream. Additionally, the location of the stitch line within the overlapping region may be based, at least in part, on the speed of the vehicle. In some embodiments, the stitch line may be moved inward relative to the vehicle based, at least in part, on the speed of the vehicle.

According to yet another aspect of the present disclosure, a composite video stream display device is disclosed. The composite video stream display device may include a display, a controller, and/or an input device. The display may be operable to display a composite video stream. The controller may be operable to receive a first video stream having a first field of view; a second video stream having a second field of view, wherein the second video stream overlaps with the first field of view to define an overlapping region; and an input signal from the input device. The input signal may correspond to an object detection and/or a vehicle speed. Further, the controller may be operable to produce the composite video stream by cropping at least one of the first and second video streams along a stitch line in the overlapping region of at least one of the first and second fields of view, and further disposing the first and second video streams adjacent one another in abutting contact. Additionally, the location of the stitch line within the overlapping region may be based, at least in part, on the input signal. In some embodiments, the stitch line may be moved inward relative to the vehicle based, at least in part, on the speed of the vehicle.

According to yet another aspect of the present disclosure a warping imaging system is disclosed. The warping imaging system may comprise an imager, an input device, a controller and/or a display. The imager may be operable to capture a first video stream of a scene exterior a vehicle. The input device may be operable to provide an input signal. In some embodiments, the input device may correspond to a blind spot monitoring device. Accordingly, the input signal may correspond to a detection of an object in the blind spot of the vehicle. The controller may be communicatively connected to the imager to receive the first video stream and the input device to receive the input signal. Further, the controller may be operable to capture to produce a second video stream based, at least in part, on the first video stream. Additionally, the second video stream may have a warp. The warp may be abased at least in part, on the input signal. In some embodiments, the warp may be an aspherical warp. The display maybe communicatively connected to the controller to receive the second video stream. Accordingly, the display device may be operable to display the second video stream.

The advantages of certain embodiments of the present disclosure include reduced blur and/or better fields of view. For example, these advantages may be achieved by changing an imager field of view and/or producing an augmented field of view in response to input signals Additionally, other embodiments of the present disclosure include the advantage of a dynamic composite display video stream with less distortion. For example, moving the stitching line in response to the vehicle's speed allows for the stitching line to be moved such that the stitching line is aligned with a region of decreased interest to the driver or a region where an object, like another vehicle, is least likely to be present when driving at that speed.

DETAILED DESCRIPTION

For the purposes of description herein, the specific systems illustrated in the attached drawings and described in this disclosure are simply exemplary embodiments of the inventive concepts defined in the appended claims. Hence, specific dimensions and other characteristics relating the embodiments disclosed herein are not to be considered limiting, unless the claims expressly state otherwise.

The present disclosure is directed to a system for providing a driver of a vehicle with enhanced views of a scene external the vehicle, relative views provided by previous systems. Accordingly, imaging systems are disclosed along with related methods. These imaging systems may address the problems of blur at high speeds, gaps in fields of view, fields of view that may make other vehicles appear to have rear-ended the driver's vehicle when stopped, and distorted objects along stitching lines.

Figure 1A:
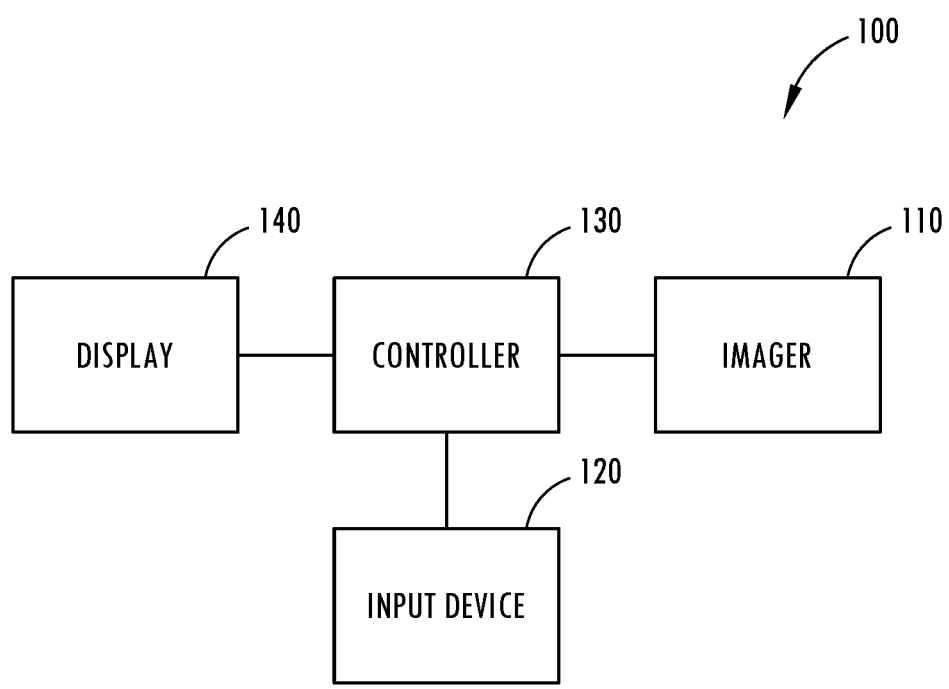
FIG. 1a: Schematic representation of an imaging system.
Figure 1B:
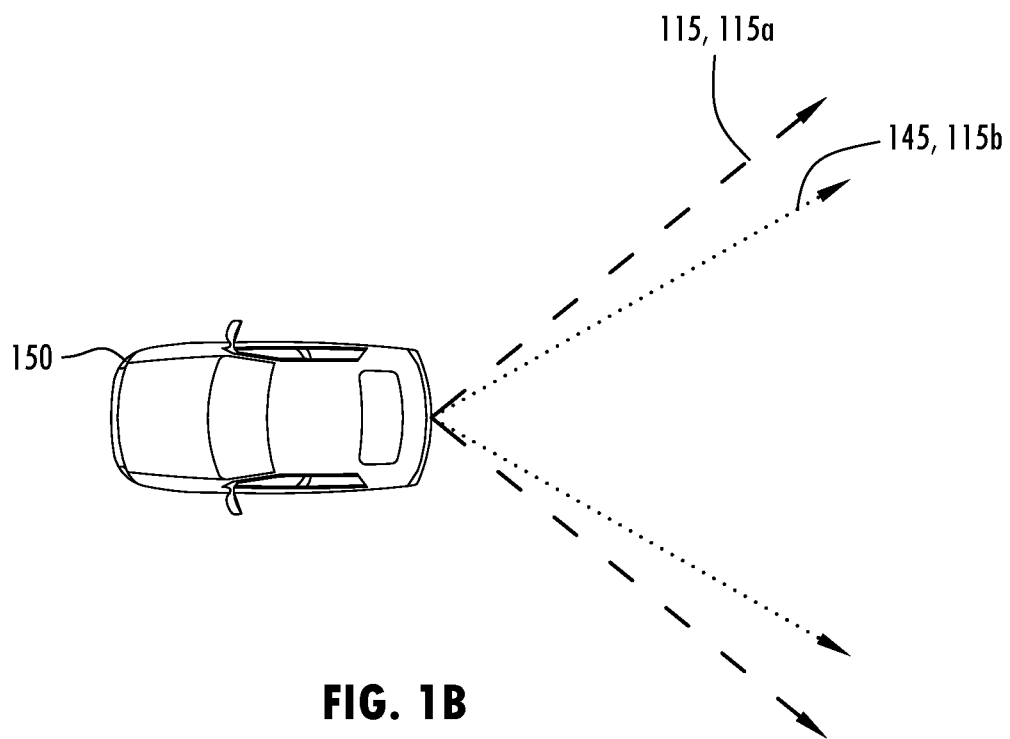
FIG. 1b: Overhead perspective schematic representation for changing an imager field of view by zooming and/or augmenting the field of view by way of a horizontal field of view angle.
Figure 1C:
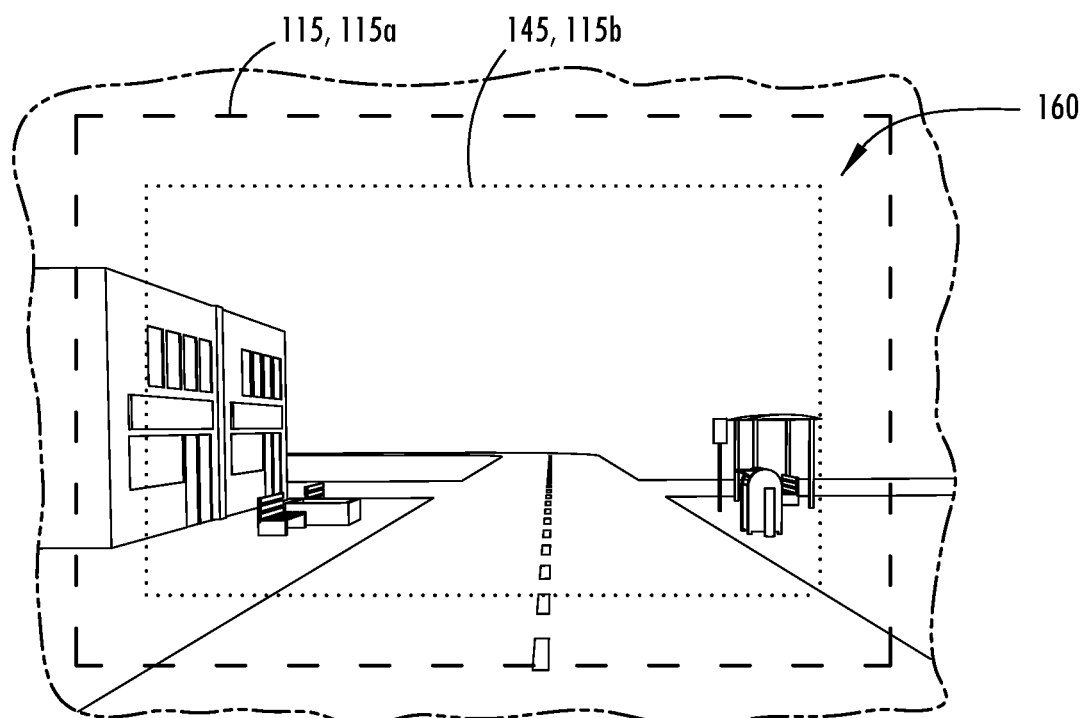
FIG. 1c: Rearward perspective schematic representation for changing an imager field of view by zooming and/or augmenting the field of view by way of a horizontal field of view angle.
Figure 1D:
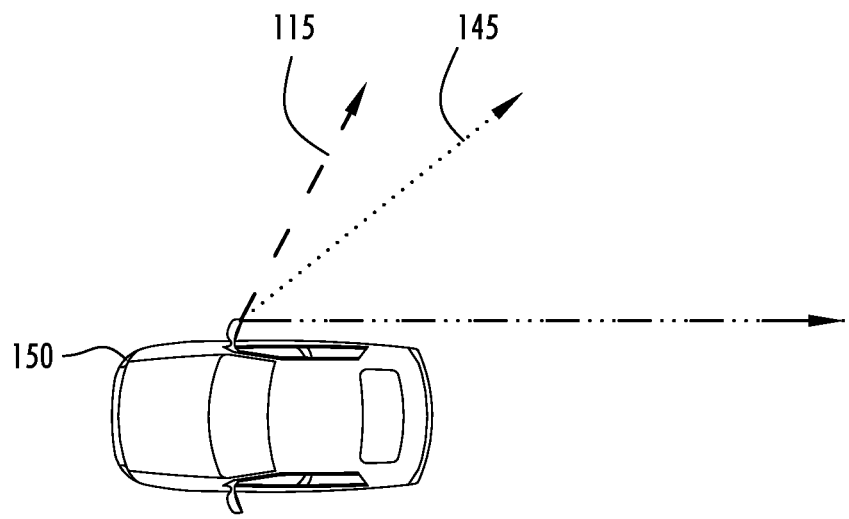
FIG. 1d: Overhead perspective schematic representation for augmenting a field of view by way of a horizontal field of view angle.
Figure 1E:
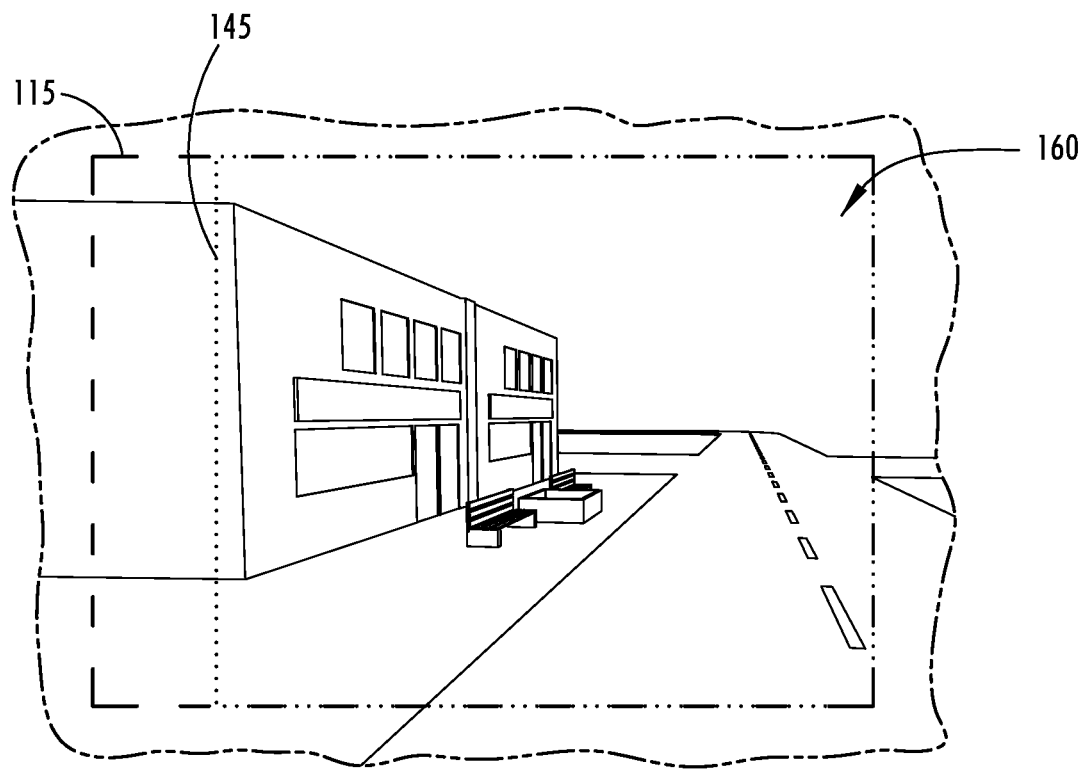
FIG. 1e: Rearward perspective schematic representation for augmenting a field of view by way of a horizontal field of view angle.
Figure 1F:
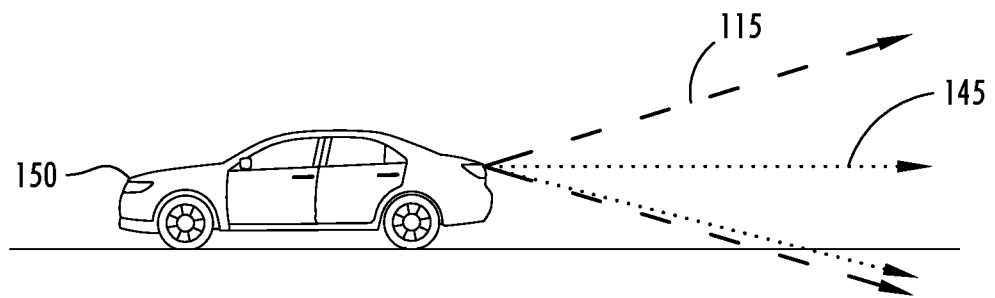
FIG. 1f: Side perspective schematic representation for augmenting a field of view by way of a vertical field of view angle.
Figure 1G:
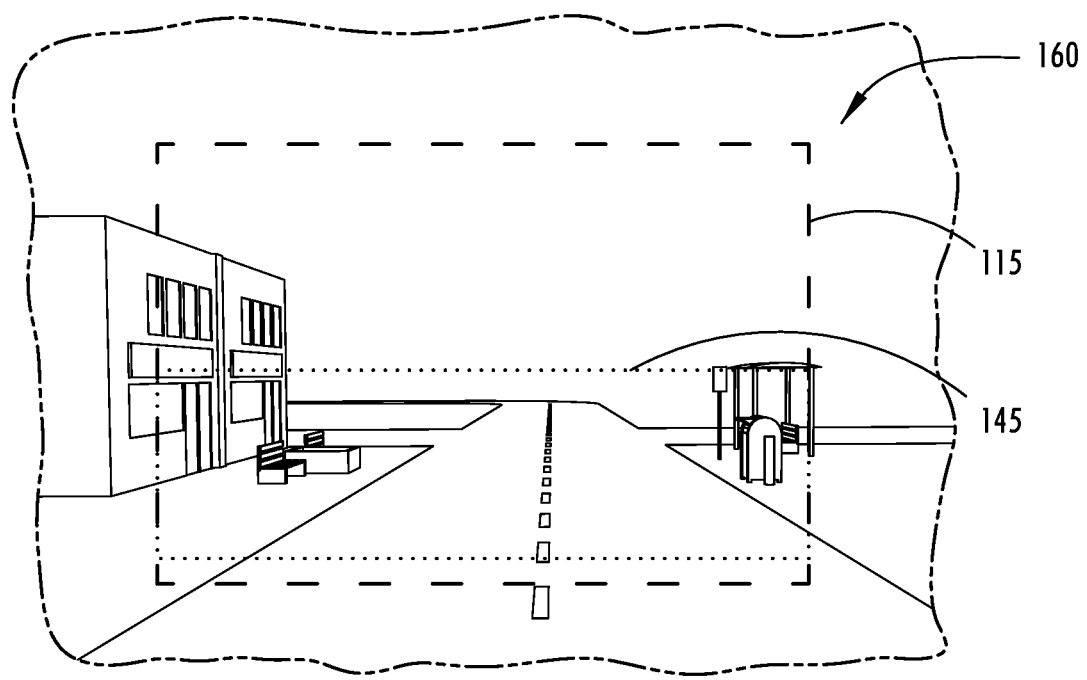
FIG. 1g: Rearward perspective schematic representation for augmenting a field of view by way of a vertical field of view angle.
Figure 1H:
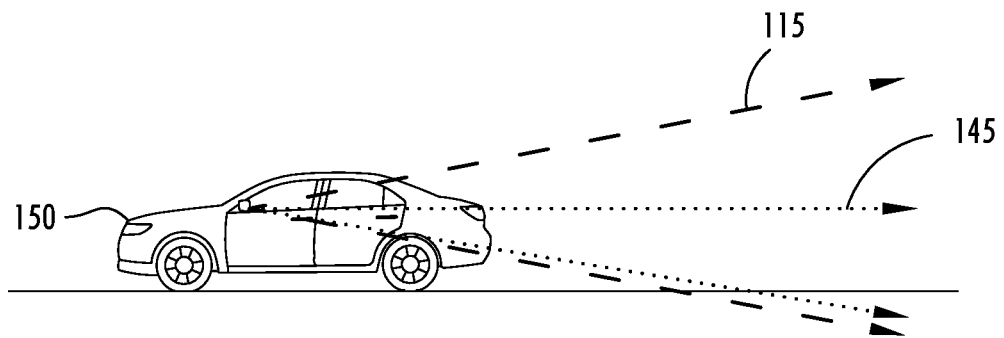
FIG. 1h: Side perspective schematic representation for augmenting a field of view by way of a vertical field of view angle.
Figure 1I:
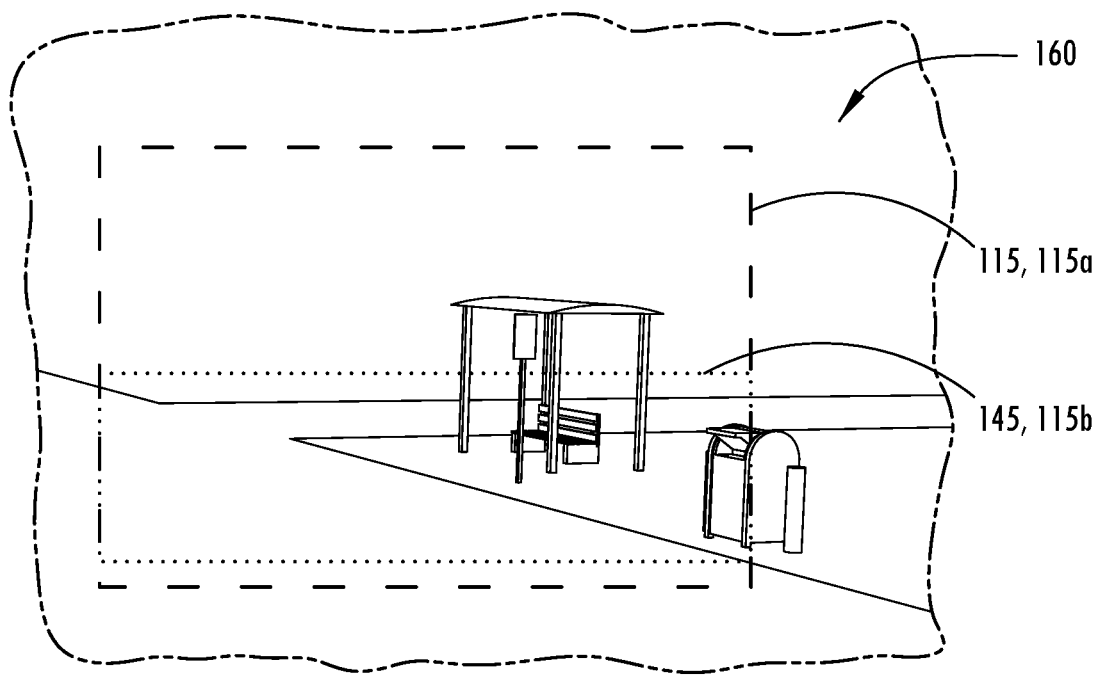
FIG. 1i: Rearward perspective schematic representation for augmenting a field of view by way of a vertical field of view angle.
Figure 1J:
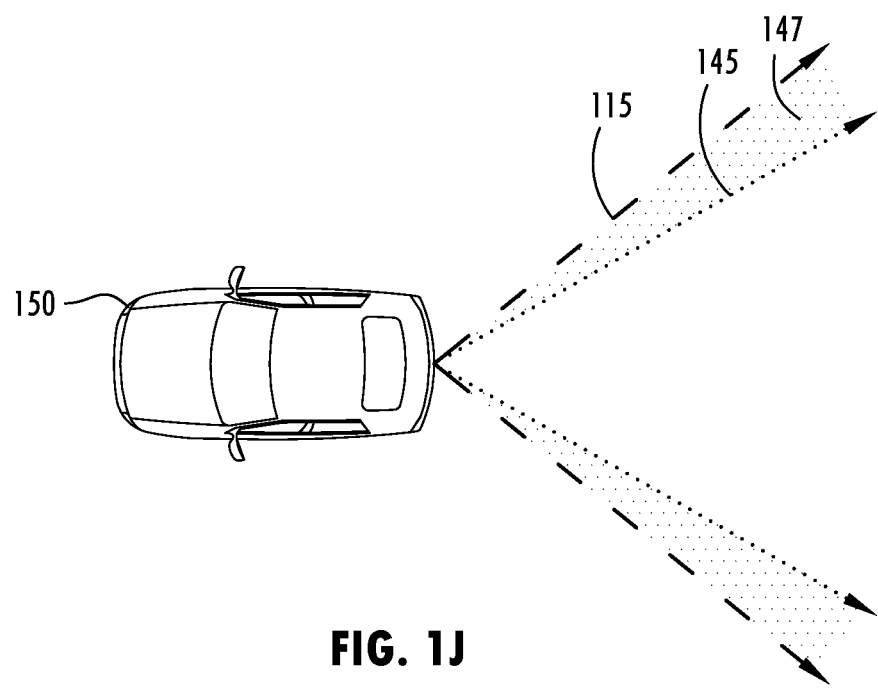
FIG. 1j: Overhead perspective schematic representation for obscuring a periphery of an imager field of view.
Figure 1K:
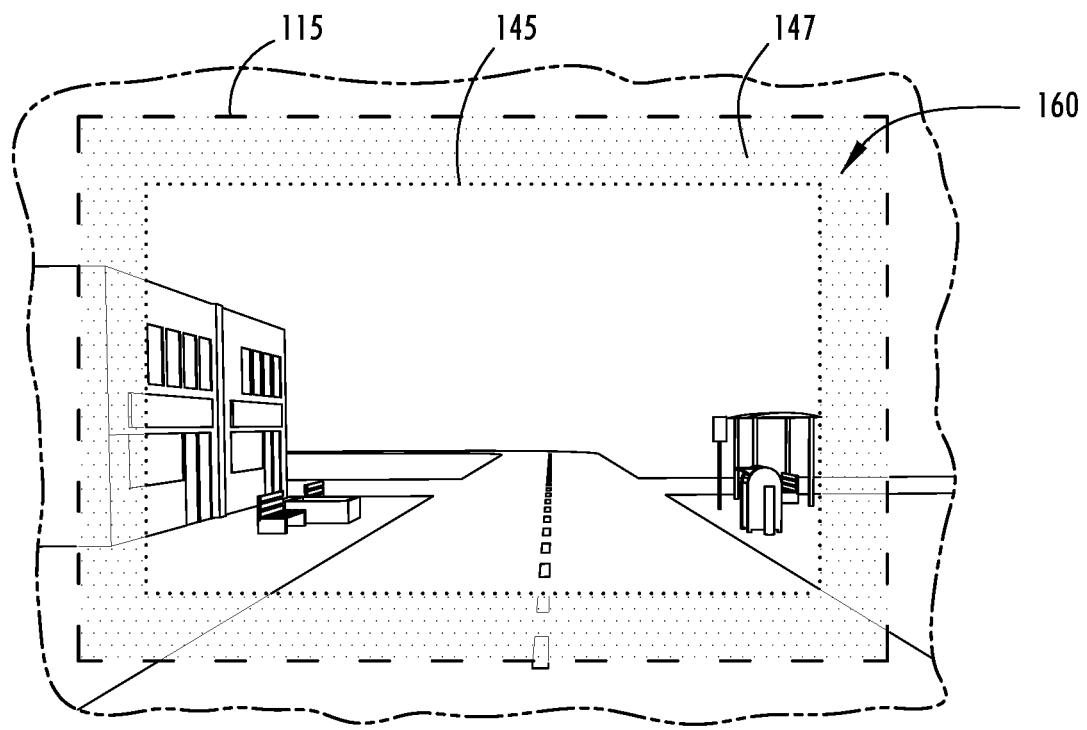
FIG. 1k: Rearward perspective schematic representation for obscuring a periphery of an imager field of view.
Figure 1L:
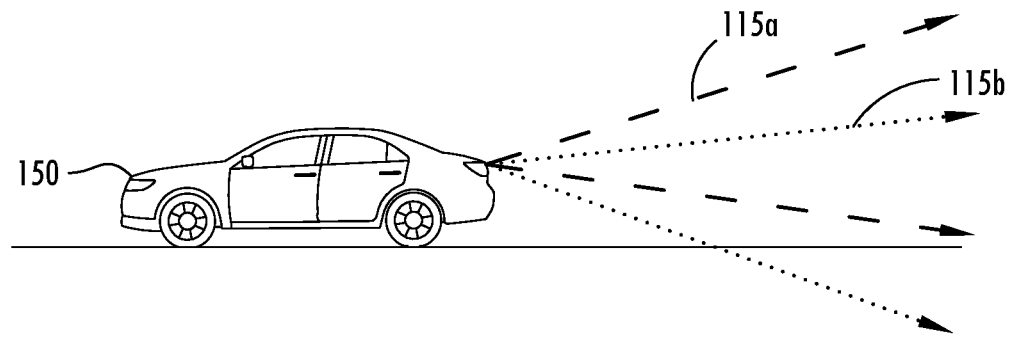
FIG. 1l: Side perspective schematic representation for changing an imager field of view by way of vertical pitch.
Figure 1M:
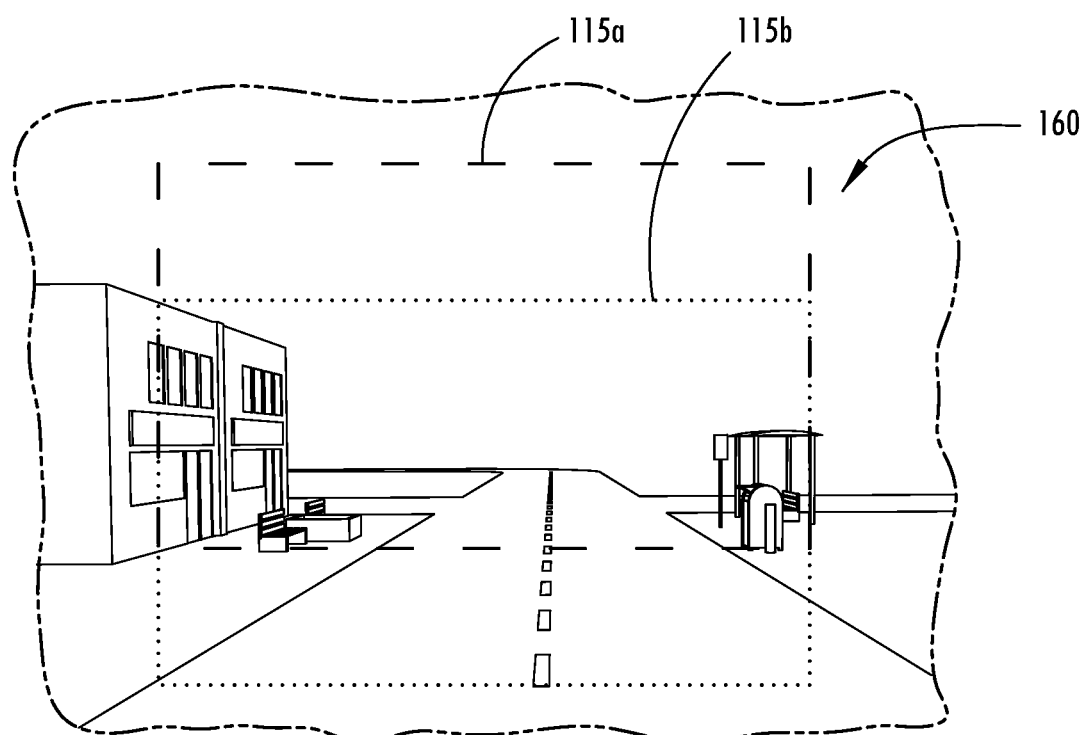
FIG. 1m: Rearward perspective schematic representation for changing an imager field of view by way of vertical pitch.
Figure 1N:
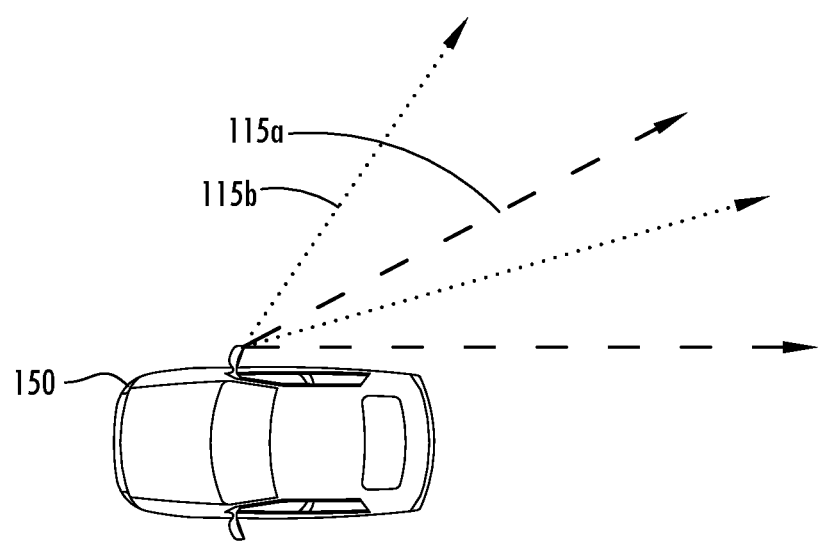
FIG. 1n: Overhead perspective schematic representation for changing an imager field of view by way of horizontal yaw.
Figure 1O:
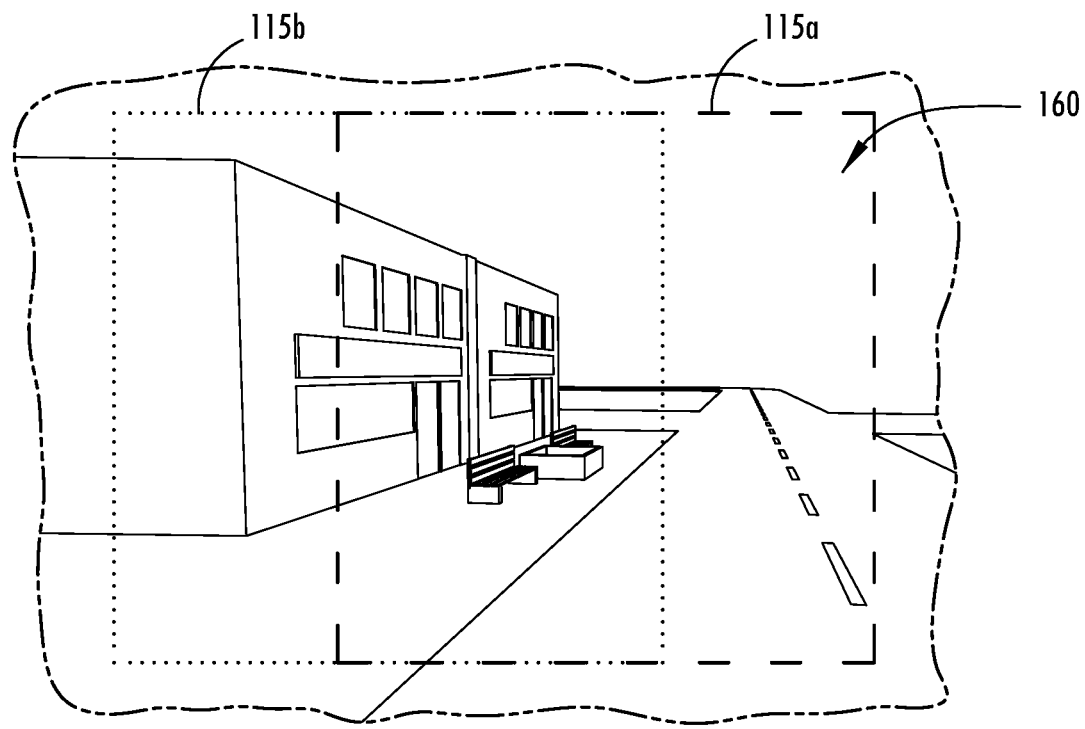
FIG. 1o: Rearward perspective schematic representation for changing an imager field of view by way of horizontal yaw.

FIGS. 1a-o illustrate an imaging system 100. Imaging system 100 may comprise an imager 110, one or more input device 120, a controller 130, and/or a display 140. Further, imaging system 100 may be incorporated into a vehicle 150.

Imager 110 may be any device operable to capture light and generate a corresponding imager video stream. The imager video stream has an imager field of view 115. Imager field of view 115 may correspond to a scene 160 exterior of vehicle 150. Further, imager field of view 115 may correspond to a field of view traditionally associated with an interior rear-view mirror, driver side exterior mirror, passenger side exterior mirror, or back-up camera. Accordingly, for example, imager 110 may be disposed on a rear portion or a side portion of vehicle 150. In some embodiments, imager 110 may comprise a lens. Additionally, in some further embodiments, imager 110 and/or the lens may be directly or indirectly articulable in the vertical and/or horizontal directions, thereby operable to change imager field of view 115 from a first imager field of view 115a to a second imager field of view 115b. In some other further embodiments, the lens may be operable to change a level of zoom or power, likewise changing imager field of view 115 from first imager field of view 115a to second imager field of view 115b.

An input device 120 may be a device such as a vehicle speed detector, a blind spot detector, a transmission, a gear selector, or an auxiliary imager, and is operable to provide an input signal. Further, the input signal may be generated automatically in response to detecting an input condition, such as object, speed, gear, or direction of travel detection. Accordingly, the input signal may be generated automatically without a command from a user to do so. In embodiments where input device 120 is a blind spot detector, the input signal may correspond to the presence of an object in vehicle's 150 blind spot. In embodiments where input device 120 is a transmission or a gear selector, the input signal may correspond to the gear vehicle 150 is currently in, such a park, reverse, neutral, drive, high, low, $1^{st}$, $2^{nd}$, $3^{rd}$ etc. In embodiments where input device 120 is an auxiliary imager, the input signal may correspond to an image or a video stream of the auxiliary imager ("auxiliary image" or "auxiliary video stream"), which may be analyzed to make determinations of objects and scenes exterior vehicle 150. In embodiments where input device 120 is a vehicle speed detector, the vehicle speed detector may be any device operable to determine the current speed of vehicle 150. For example, the vehicle speed detector may be a conventional speedometer incorporated into vehicle 150 or may be a global positioning system ("GPS") receiver. In some embodiments, the vehicle speed detector may be further operable to determine the direction of travel of vehicle 150. For example, vehicle speed detector 120 may be operable to determine whether vehicle 150 is traveling in a forward or a reverse direction.

Controller 130 may comprise a processor and/or a memory. Further, controller 130 may be communicatively connected to imager 110, input device 120, and/or display 140. As used herein, "communicatively connected" may mean connected directly or indirectly though one or more electrical components. Further, the memory may store one or more field of view algorithm, which may be executed by the processor. A field of view algorithm may be operable to change imager field of view 115 from a first imager field of view 115a to a second imager field of view 115b by actuation of imager 110 and/or produce a display video stream having an augmented field of view 145. Augmented field of view 145 may be different than imager field of view 115. An augmented field of view 145 may be a portion of scene 160 observable by a driver looking at the display video stream. In other words, augmented field of view 145 may be a display field of view where the display field of view is different than imager field of view 115. Additionally, a difference between first imager field of view 115a and second imager field of view 115b and/or between imager field of view 115 and augmented field of view 145 may be based, at least in part, on one or more input signals and/or imager video streams.

Display 140 may be any device operable to emit light corresponding to a video stream. Therefore, display 140 may be operable to provide a user with images corresponding to the video stream. For example, display 140 may be LCD, LED, OLED, plasma, DLP, or other technology and operable to display the imager video stream and/or the display video stream. Accordingly, display 140 is communicatively connected to controller 130. In some embodiments, display 140 may be incorporated into one or more of or replace one or more of the vehicle's 150 rear view assemblies, such as a rearview or side view mirror.

In operation, controller 130 may receive at least part of the imager video stream. Additionally, controller 130 may produce the display video steam based, at least in part, on the imager video stream. The display video stream may be the same or different than the imager video stream. In particular, the display video stream may be a portion of the imager video stream.

In some embodiments, the display video stream may be produced such that augmented field of view 145 is different than imager field of view 115 in response to one or more input signal. For example, as shown in FIGS. 1b-k, imager field of view 115 and augmented field of view 145 may be different by way of their horizontal field of view angle (FIGS. 1b-e), their vertical field of view angle (FIGS. 1f-i). and/or a completely or partially obscured periphery (FIGS. 1j-k).

In embodiments where imager field of view 115 and augmented field of view 145 are different by way of their horizontal field of view angles (FIGS. 1b-e), the field of view algorithm may produce the display video stream by cropping the imager video stream such that one or more of the vertical boundaries of the resulting display video stream are moved inward relative to the imager field of view's 115 vertical boundaries. A vertical boundary may be a boundary of the imager field of view 115 and/or an augmented field of view 145 where the extent of the boundary is vertical with respect to the imager video stream and/or display video stream. Further, with respect to the imager video stream and/or display video stream, the vertical boundary may be a line. Accordingly, the line may extend in a vertical orientation. In three-dimensional space, the vertical boundary may present itself as a plane. A horizontal field of view angel may be an angle defined between the planes of two vertical boundaries. In some embodiments, both vertical boundaries may move inward equally (FIG. 1c). In other embodiments, just one vertical boundary may move inward (FIGS. 1d-e). In yet other embodiments, both vertical boundaries may move inward, but by different amounts. Further, in some embodiments, an warp may be applied horizontally.

Further, the field of view algorithm may be operable to move the vertical boundary of augmented field view 145 inward, relative imager field of view 115, in response to one or more input signal. Additionally, the field of view algorithm may readjust the amount by which the vertical boundary is moved in response to new and/or changed input signals. Accordingly, the field of view algorithm may be operable to move the vertical boundary of augmented field view 145 inward, relative imager field of view 115, based, at least in part, on one or more input signal. For example, the field of view algorithm may move the vertical boundaries based, at least in part, on an input signal from a vehicle speed detector. Thus, the horizontal field of view angle may change based, at least in part, on the input signal. Further, the horizontal of view angle may be changed as a stepwise or a non-stepwise function of the input signal. In some embodiments, augmented field of view 145 may have horizontal field of view angle of about: 59°, 55°, 51°, 47°, 42°, 38°, or 34°, when vehicle 150 has a speed in the ranges of about: 0-5 mph, 5-10 mph, 10-20 mph, 20-30 mph, 30-40 mph, 40-50 mph, or 50+ mph, respectively. As an additional example, the field of view algorithm may move the vertical boundaries based, at least in part, on an input signal from a blind spot detector to provide a user with a better view of one or more objects in the vehicle's 150 blind spot. Additionally, in some embodiments, the horizontal field of view angle may be manually selected and/or adjusted by a user. The user may adjust the horizontal field of view angles via an over-ride through interaction with a user interface.

In embodiments where imager field of view 115 and augmented field of view 145 are different by way of their vertical field of view angle (FIGS. 1f-i), the field of view algorithm may produce the display video stream by cropping the imager video stream such that one or more of the horizontal boundaries of the resulting display video stream are moved inward relative the imager field of view's 115 horizontal boundaries. A horizontal boundary may be a boundary of the imager field of view 115 and/or augmented field of view 145 where the extent of the boundary is horizontal with respect to the imager video stream and/or the display video stream. Further, with respect to the imager video stream and/or the display video stream, the horizontal boundary may be a line. Accordingly, the line may extend in a horizontal orientation. In three-dimensional space, the horizontal boundary may present itself as a plane. A vertical field of view angel may be an angle defined between the planes of two horizontal boundaries. In some embodiments, both horizontal boundaries may move inward equally. In other embodiments just one vertical boundary may move inward or both may move inward to different extents. Further, in some embodiments, an warp may be applied vertically.

Further, the field of view algorithm may move the horizontal boundaries of augmented field view 145 inward, relative imager field of view 115, in response to one or more input signal.

For example, the field of view algorithm may move the horizontal boundaries in response to an input signal from a vehicle speed detector. Additionally, the field of view algorithm may readjust the extent to which the horizontal boundaries are moved in response to new and/or changed input signals. Accordingly, the field of view algorithm may move the horizontal boundaries of augmented field view 145 inward, relative imager field of view 115, based, at least in part, on one or more input signal. Thus, the vertical field of view angle may change based, at least in part, on the input signal. Further, the vertical field of view angle may be changed as a stepwise or a non-stepwise function of the input signal. Additionally, in some embodiments, the vertical field of view angle may be manually selected and/or adjusted by a user. The user may adjust the horizontal vertical field of view angle via an over-ride through interaction with a user interface.

In embodiments where imager field of view 115 and augmented field of view 145 are different by way of a completely or partially obscured periphery 147 (FIGS. 1j-k), the field of view algorithm may produce the display video stream by obscuring a periphery of imager field of view 115, at least in part. The portion of the periphery obscured may correspond to one or more portion along one or more vertical boundary and/or one or more horizontal boundary. The imager video stream may be obscured, for example, by applying a blur, a haze, a pattern, and/or a blocking graphic, to the imager video stream. Augmented field of view 145, of the resulting display video stream, may be defined by obscured periphery 147 such that it corresponds to a region interior thereto. Further, the field of view algorithm may obscure one or more potion along one of more vertical and/or one or more horizontal boundary of the augmented field view 145 inward, relative to imager field of view 115, in response to on one or more input signal. Additionally, the field of view algorithm may readjust the depth or degree to which the periphery obscured in response to new and/or changed input signals. Accordingly, augmented field of view 145 may be adjusted based, at least in part, on the input signals. Thus, the horizontal and/or vertical field of view angles of the augmented field of view 145 may change based, at least in part, on the input signal. Further, the horizontal and/or vertical field of view angles may be changed as a stepwise or a non-stepwise function of the input signal. In some embodiments, the input signal may be from a vehicle speed detector. For example, auxiliary field of view 145 may have horizontal field of view angles of about: 59°, 55°, 51°, 47°, 42°, 38°, or 34°, when vehicle 150 has a speed in the ranges of about: 0-5 mph, 5-10 mph, 10-20 mph, 20-30 mph, 30-40 mph, 40-50 mph, or 50+ mph, respectively. Additionally, in some embodiments, the horizontal and/or vertical field of view angles may be manually selected and/or adjusted by a user. The user may adjust the horizontal and/or vertical field of view angles via an override through interaction with a user interface.

Alternatively, in other embodiments, controller 130 may change imager field of view 115 directly (FIGS. 1*b-c* and 1*l-o*). Accordingly, imager field of view 115 may be changed from a first imager field of view 115*a* to a second imager field of view 115*b*. For example, controller 130 may change imager field of view 115 by way of articulating imager 110 and/or articulating a lens of imager 110 to zoom in or out (FIGS. 1*b-c*), point in a vertically upward or downward direction (i.e. change its "vertical pitch") (FIGS. 1*l-m*), and to point horizontally in a driver's or passenger's side direction (i.e. change its "horizontal yaw") (FIGS. 1*n-o*). Further, imager field of view 115 may be changed based, at least in part, on one or more input signals.

In embodiments where imager field of view 115 is changed by way of articulating imager 110 and/or the lens of imager 110 to zoom in or out (FIGS. 1*b-1c*), the field of view algorithm may initiate or change the zoom in a centered or an off-centered fashion. Further, the field of view algorithm may zoom in response to one or more input signals. Additionally, the field of view algorithm may readjust the extent to which imager 110 is zoomed in response to new and/or changed input signals. For example, the field of view algorithm may change the zoom 110 in response to an input signal from a vehicle speed detector. Thus, the horizontal and/or vertical field of view angles may change based, at least in part, on the input signal. Further, the horizontal and/or vertical field of view angles may be changed as a stepwise or a non-stepwise function of the input signal. In some embodiments, imager field of view 115 may have horizontal field of view angles of about: 59°, 55°, 51°, 47°, 42°, 38°, or 34°, when vehicle 150 has a speed in the ranges of about: 0-5 mph, 5-10 mph, 10-20 mph, 20-30 mph, 30-40 mph, 40-50 mph, or 50+ mph, respectively. Additionally, in some embodiments, the horizontal and/or vertical field of view angles may be manually selected and/or adjusted by a user. The user may adjust the horizontal and/or vertical field of view angles via an over-ride through interaction with a user interface.

In some embodiments where the field of view algorithm may articulate imager 110 and/or the lens of imager 110 to change the vertical pitch (FIGS. 1*l-m*), imager field of view 115 may be moved upward or downward. Further, the field of view algorithm may change the vertical pitch in response to one or more input signals. Additionally, the field of view algorithm may readjust the vertical pitch in response to new and/or changed input signals. For example, the field of view algorithm may change the vertical pitch in response to an input signal from a vehicle speed detector. Accordingly, when vehicle 150 is traveling at a speed lower than a speed threshold or is traveling in reverse, the vertical pitch may be changed downward. To illustrate, when vehicle 150 is traveling at speeds in the range of 0-5 mph, imager 110 and or the lens of imager 110 may be articulated approximately 2 degrees downward. Likewise, when vehicle 150 is traveling in reverse, imager 110 and or the lens of imager 110 may be articulated approximately 3 degrees downward. Therefore, the field of view algorithm may change the vertical pitch of imager field of view 115 based, at least in part, on one or more input signals.

In some embodiments where the field of view algorithm may articulate imager 110 and/or a lens of imager 110 to change the horizontal yaw (FIGS. 1*n-o*), imager field of view 115 may be moved in a passenger's side direction or a driver's side direction. Further, the field of view algorithm may change the horizontal yaw in response to one or more input signals. Additionally, the field of view algorithm may readjust the horizontal yaw response to new and/or changed input signals. For example, the field of view algorithm may change the horizontal yaw in response to an input signal from a vehicle speed detector or a blind spot detector. Accordingly, when vehicle 150 is traveling at slower speeds, imager field of view 115 may be directed outward of vehicle 150. Likewise, when an object is detected in the vehicle's 150 blind spot, imager field of view 115 may be articulated to better capture or center the detected object. Therefore, the field of view algorithm may change the horizontal yaw of imager field of view 115 based, at least in part, on one or more input signals.

Some embodiments of the present disclosure may have the advantages of reduced blur and/or better fields of view. These advantages may be achieved by changing imager field of view 115 and/or producing augmented field of view 145 based, at least in part, on input signals such as from a speed detector, a transmission, a gear selector, or a blind spot detector.

Embodiments where imager field of view 115 is changed from a first imager field of view 115*a* to a second imager field of view 115*b* and/or augmented field of view 145 is produced based, at least in part, on a signal from a speed detector may have the advantage of reduced blur. Blur may occur along the horizontal and/or vertical extremes of the display video stream. The blur may be caused by objects moving rapidly on the display video stream due to being at a relatively close distance to imager 110 when vehicle 150 is moving. Further, the blur is increasingly prevalent the faster vehicle 150 is moving. Accordingly, articulating or moving at least one boundary of second imager field of view 115*b* and/or augmented field of view 145 inward toward vehicle 150 relative first imager field of view 115*a* or imager field of view 115, respectively, based, at least in part, on a signal from a speed detector may reduce or eliminate blur by reducing or eliminating extremes from the video stream where objects are likely closest and focusing the video stream inward relative vehicle 150 where objects are likely further away.

Embodiments where imager field of view 115 is changed from a first imager field of view 115*a* to a second imager field of view 115*b* and/or augmented field of view 145 is produced based, at least in part, on a signal from a speed detector, a transmission, and/or a gear selector may have the advantage of a better field of view. In situations where vehicle 150 is moving slowly and/or in reverse, the area of scene 160 most likely of interest to a driver is closer to vehicle 150. Accordingly, articulating imager 110 and/or the imager's 110 lens and/or producing augmented field of view 145 to focus the display video stream on this area provides a better field of view to a driver.

Embodiments where imager field of view 115 is changed from a first imager field of view 115*a* to a second imager field of view 115*b* and/or augmented field of view 145 is produced based, at least in part, on a signal from a blind spot detector, may likewise have the advantage of a better field of view. In situations where an object is detected in a blind spot of vehicle 150, the area where the object is detected is the area of scene 160 most likely of interest to a driver. Accordingly, articulating imager 110 and/or the imager's 110 lens and/or producing augmented field of view 145 to focus the display video stream on this area provides a better field of view to a driver.

FIGS. 2*a-d* illustrate an imaging system 200. Imaging system 200 may comprise an imager 210, one or more input device 220, a controller 230, and/or a display 240. Further, imaging system 200 may be incorporated into a vehicle 250.

Imager 210 may be any device operable to capture light and generate a corresponding imager video stream 215. Imager video stream 215 has an imager field of view 217. Further, the imager video stream 215 may correspond to all or part of a scene 260 exterior of vehicle 250. Scene 260 may be a scene traditionally associated with an interior rear-view mirror, driver side exterior mirror, passenger side exterior mirror, or back-up camera. Accordingly, for example, imager 210 may be disposed on a rear portion and/or a side portion of vehicle 250.

An input device 220 may be a device such as a vehicle speed detector, a blind spot detector, a transmission, a gear selector, or an auxiliary imager, and is operable to provide an input signal. Further, the input signal may be generated automatically in response to detecting an input condition, such as object, speed, gear, or direction of travel detection. Accordingly, the input signal may be generated automatically without a command from a user to do so. In embodiments where input device 220 is a blind spot detector, the input signal may correspond to the presence of an object in vehicle's 250 blind spot. In embodiments where input device 220 is a transmission or a gear selector, the input signal may correspond to the gear vehicle 250 is currently in, such a park, reverse, neutral, drive, high, low, $1^{st}$, $2^{nd}$, $3^{rd}$ etc. In embodiments where input device 220 is an auxiliary imager, the input signal may correspond to an image or a video stream of the auxiliary imager ("auxiliary image" or "auxiliary video stream"), which may be analyzed to make determinations of objects and scenes exterior vehicle 250. In embodiments where input device 220 is a vehicle speed detector, the vehicle speed detector may be any device operable to determine the current speed of vehicle 250. For example, the vehicle speed detector may be a conventional speedometer incorporated into vehicle 250 or may be a global positioning system ("GPS") receiver. In some embodiments, the vehicle speed detector may be further operable to determine the direction of travel of vehicle 250. For example, vehicle speed detector 220 may be operable to determine whether vehicle 250 is traveling in a forward or a reverse direction.

Controller 230 may comprise a processor and a memory. Further, controller 230 may be communicatively connected to imager 210, input device 220, and/or display 240. Further, the memory may store one or more warping algorithms, which may be executed by the processor. A warping algorithm may be operable to apply a warp, to the imager video stream 215, to produce display video stream 245 having a warped image. Display video stream 245 may be warped such that a warp is applied horizontally and/or vertically. Accordingly, for example, the warp may be aspheric, spheric, vertical, and/or horizontal warp. In some embodiments, the warp may stretch imager video stream 215 at one or more segments and/or compress the imager video stream 215 at one or more segments. Additionally, the application of a warp and/or the amount of warping applied may be based, at least in part, on one or more input signals and/or imager video streams. Further, display video stream 245 has a field of view 247. Display video stream 245 field of view 247 may be the same or different than imager video stream 215 field of view 217.

Display 240 may be any device operable to emit light corresponding to a video stream. Therefore, display 240 may be operable to provide a user with images corresponding to the video stream. For example, display 240 may be LCD, LED, OLED, plasma, DLP, or other technology and operable to display the imager video stream and/or the display video stream. Accordingly, display 240 is communicatively connected to controller 230. In some embodiments, display 240 may be incorporated into or replace one or more of the vehicle's 250 rear view mirrors.

Figure 2A:
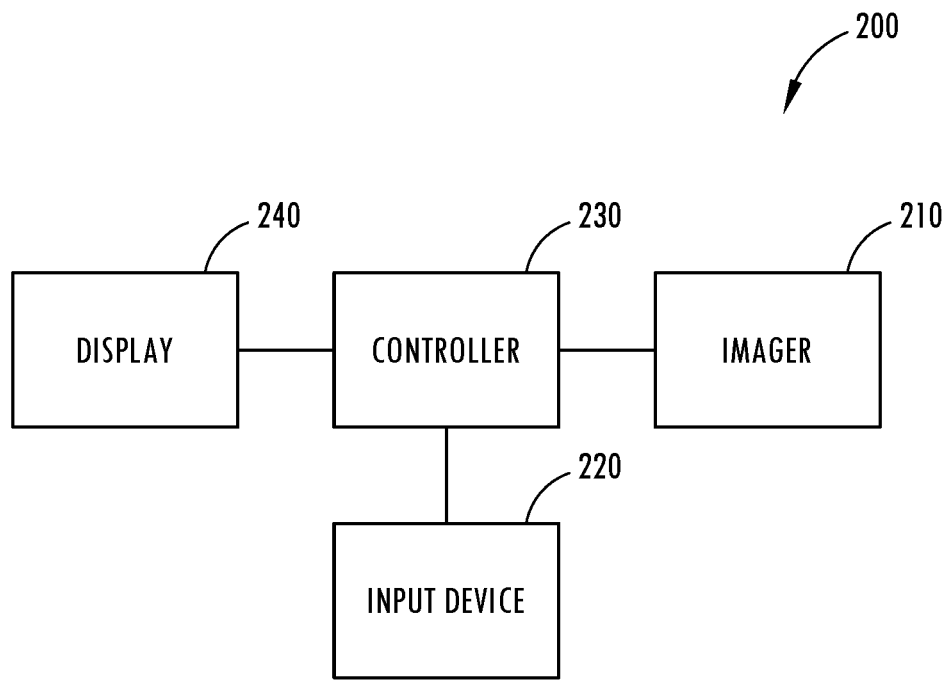
FIG. 2a: Schematic representation of an imaging system.
Figure 2B:
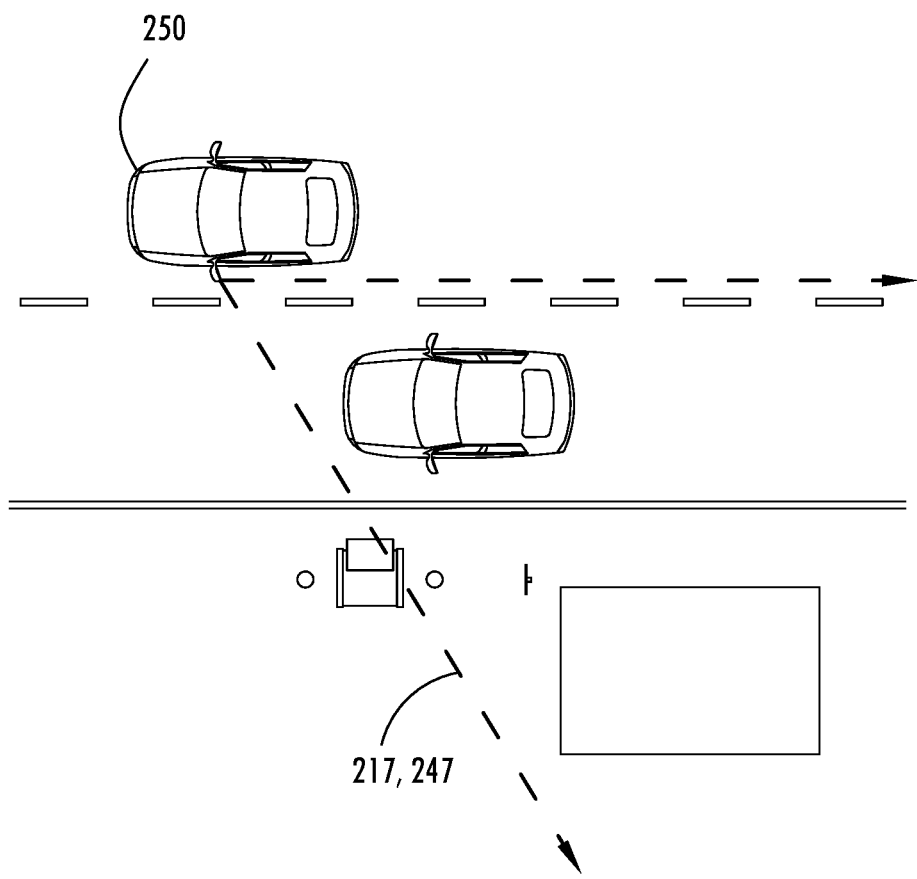
FIG. 2b: Overhead perspective representation of example of equivalent imager video stream and display video stream fields of view.
Figure 2C:
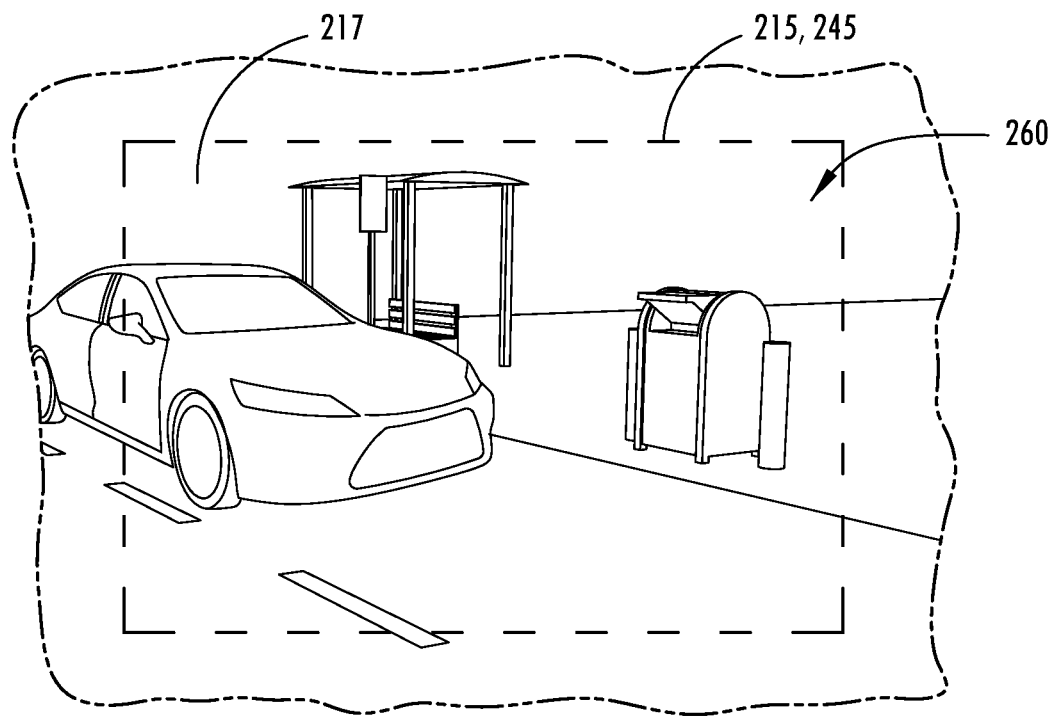
FIG. 2c: Rearward perspective schematic representation of an imager video stream.
Figure 2D:
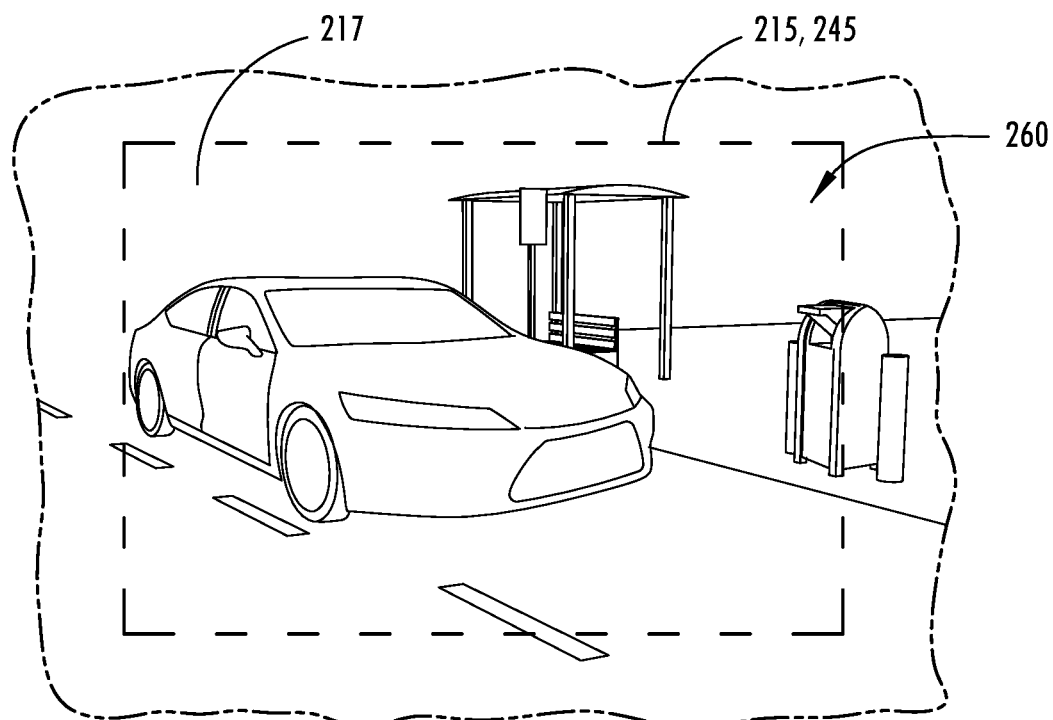
FIG. 2d: Rearward perspective schematic representation of a display video stream produced by applying a warp to an imager video stream.

In operation, controller 230 may receive at least part of imager video stream 215. Additionally, controller 230 may produce display video stream 245 based, at least in part, on imager video stream 215. Display video stream 245 may be the same as or different than imager video stream 215. In particular, the display video stream 245 may have a different degree of warp. For example, the warp may be changed from no warping to warping or between amounts of warping. Further, in some embodiments, display video stream 245 may be produced such that display video stream 245 is different than imager video stream 215 based, at least in part on, one or more input signals. For example, as shown in FIGS. 2*c-d*, the warping algorithm may apply a warp to the imager video stream 215 to produce display video stream 245. As shown in FIG. 2*b*, imager video stream 215 and display video stream 245 may have the same fields of view 217, 245. However, as shown in FIGS. 2*c-d*, display video stream 245 may be warped such that a region of imager video stream 215 is compressed and/or stretched. The warp, for example, may be applied based, at least in part, on a detection of an object in the vehicle's 150 blind spot, allowing for better focus on objects in the vehicle's 150 blind spot while retaining a view of other objects that may be present within the imager video stream 215.

Embodiments where imager video stream 215 is warped to produce a display video stream 245 may have the advantage of better allocating display space to objects of a likely increased interest, while maintaining the display of objects of a likely reduced interest, but with a reduced display space to maintain a driver's focus on the objects of likely increased interest, thereby reducing distractions.

Figure 3A:
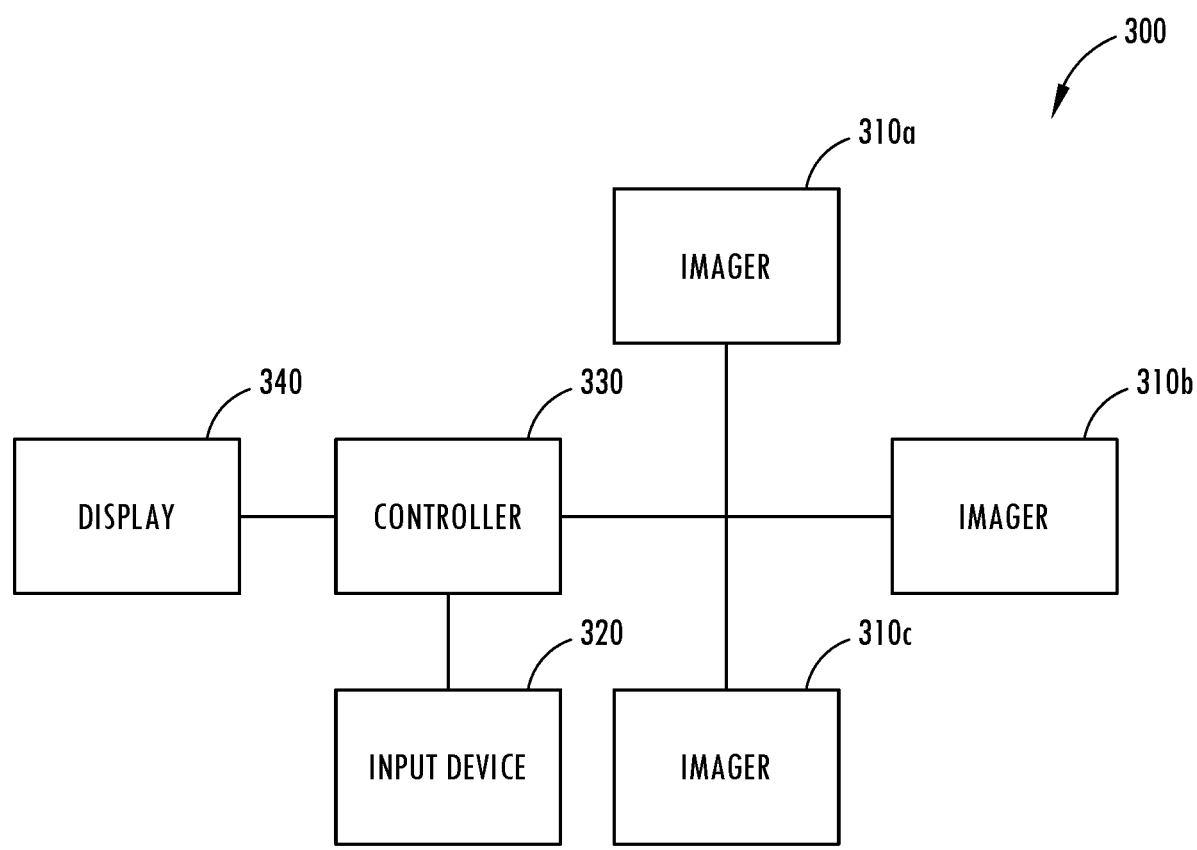
FIG. 3a: Schematic representation of a stitched imaging system.
Figure 3B:
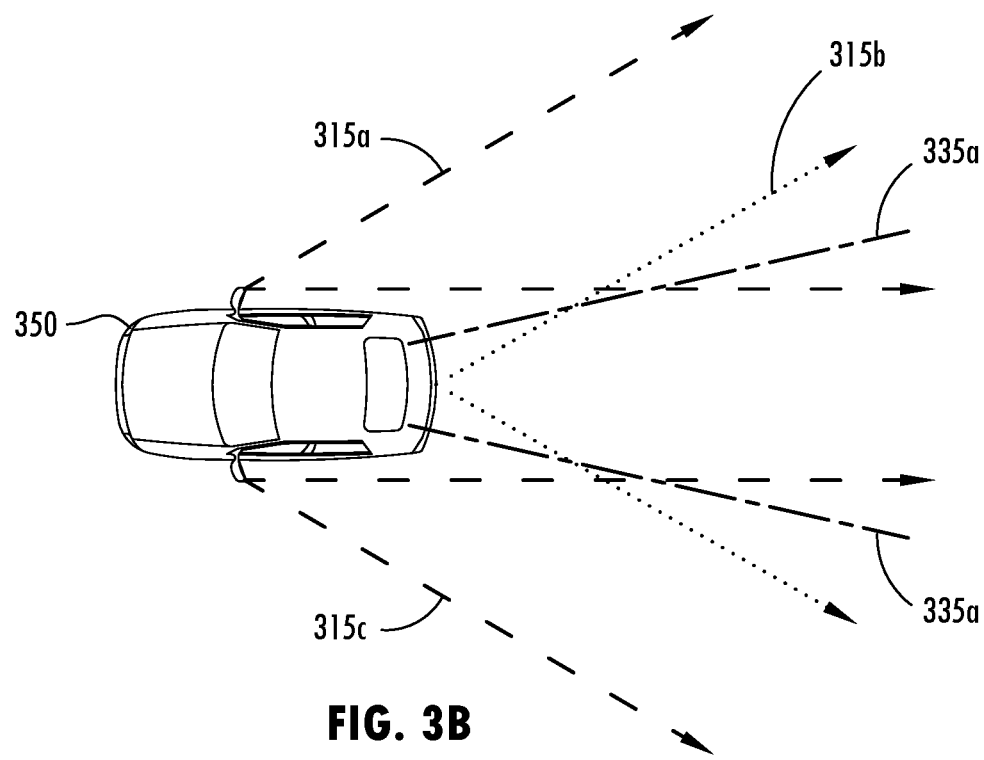
FIG. 3b: Overhead perspective schematic representation for stitching a plurality of fields of view into a composite display video stream.
Figure 3C:
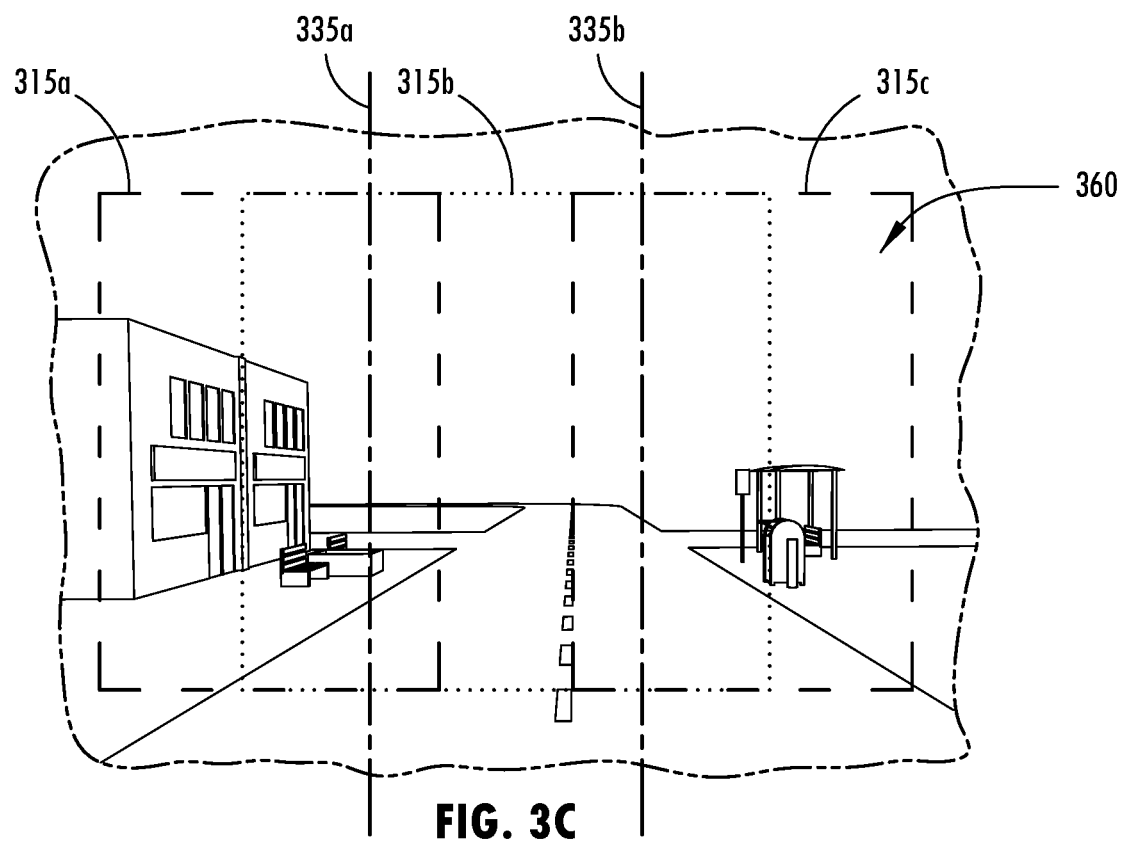
FIG. 3c: Rearward perspective schematic representation for a plurality of fields of view into a composite display video stream.

FIGS. 3*a-c* illustrate a stitched imaging system 300. Stitched imaging system 300 comprises a plurality of imagers 310, one or more input device 320, a controller 330, and/or a display 340. In some embodiments, the plurality of imagers may comprise a first imager 310*a*, a second imager 310*b*, and/or a third imager 310*c*. Further, stitched imaging system 300 may be incorporated into a vehicle 350.

An imager 310 may be any device operable to capture light and generate a corresponding imager video stream. The imager video stream has an imager field of view 315. Imager field of view 315 may correspond to a scene 360 exterior vehicle 350. Further, imager field of view 315 may correspond to a field of view traditionally associated with an interior rear-view mirror, driver side exterior mirror, passenger side exterior mirror, or back-up camera. Accordingly, for example, imager 310 may be disposed on a rear portion and/or a side portion of vehicle 350.

An input device 320 may be a device such as a vehicle speed detector, a blind spot detector, a transmission, a gear selector, or an auxiliary imager, and is operable to provide an input signal. Further, the input signal may be generated automatically in response to detecting an input condition, such as object, speed, gear, or direction of travel detection. Accordingly, the input signal may be generated automatically without a command from a user to do so. In embodiments where input device 320 is a blind spot detector, the input signal may correspond to the presence of an object in vehicle's 350 blind spot. In embodiments where input device 320 is a transmission or a gear selector, the input signal may correspond to the gear vehicle 350 is currently in, such a park, reverse, neutral, drive, high, low, $1^{st}$, $2^{nd}$, $3^{rd}$ etc. In embodiments where input device 320 is an auxiliary imager, the input signal may correspond to an image or a video stream of the auxiliary imager ("auxiliary image" or "auxiliary video stream"), which may be analyzed to make determinations of objects and scenes exterior vehicle 350. In embodiments where input device 320 is a vehicle speed detector, the vehicle speed detector may be any device operable to determine the current speed of vehicle 350. For example, the vehicle speed detector may be a conventional speedometer incorporated into vehicle 350 or may be a global positioning system ("GPS") receiver. In some embodiments, the vehicle speed detector may be further operable to determine the direction of travel of vehicle 350. For example, vehicle speed detector 320 may be operable to determine whether vehicle 350 is traveling in a forward or a reverse direction.

Controller 330 may comprise a processor and/or a memory. Further, controller 330 may be communicatively connected to the plurality of imagers 310, input device 320, and/or display 340. As used herein, "communicatively connected" may mean connected directly or indirectly though one or more electrical component. Further, the memory may store one or more stitching algorithm, which may be run by the processor. The stitching algorithm may be operable to stitch a plurality of imager video streams together to produce one composite display video stream.

Display 340 may be any device operable to emit light corresponding to a video stream. Therefore, display 340 may be operable to provide a user with images corresponding to the video stream. For example, display 340 may be LCD, LED, OLED, plasma, DLP, or other technology and operable to display the display video stream. Accordingly, display 340 may be communicatively connected to controller 330. In some embodiments, display 340 may be incorporated into or replace one or more of the vehicle's 350 rear view mirrors.

In operation, controller 330 may receive the imager video streams from the plurality of imagers 310. Additionally, controller 330 may stitch together the plurality of imager video streams to produce a composite display video stream. Each imager's 310 imager field of view 315 may overlap with at least one other imager's 310 imager field of view 315. Accordingly, to stitch the respective imager video streams together, the stitching algorithm may crop each video stream along a stitch line 335 disposed in the overlap region and dispose the cropped video streams adjacent one another in abutting contact. This process may be expanded to include any plurality of imagers 310 so long as a chain is created where there is overlap from one imager field of view 315 to the next. In some embodiments, as shown in FIGS. 3b-3c, a first imager field of view 315a, a second imager field of view 315b, and a third imager field of view 315c, corresponding to fields of view traditionally attributed to a passenger's side mirror, a rear-view mirror, and a driver's side mirror, respectively, may be stitched together to provide a display video stream. To achieve the stitched display video stream, the first and second fields of view 315a, 315b, may be stitched together along stitch line 335a and the second and third fields of view 315b, 315c, may be stitched together along stitch line 335b. Additionally, the stitching algorithm is further operable to move stitching line 335 in response to one or more input signal. For example, stitching line 335 may be moved inward or outward in response to a new or changing input signal from input device 320. Accordingly, the stitching algorithm is further operable to move stitching line 335 based, at least in part, on one or more input signal.

Some embodiments of the present disclosure may have the advantage of a dynamic composite display video stream. Composite display video streams may distort images of scene 360 at stitching line 335 due to imperfect imager 310 fields of view 315 and/or imperfect video stream cropping. Accordingly, objects disposed along stitching line 335 may appear distorted or in some instances disappear altogether. However, moving stitching line 335 in response to the input signal allows for the stitching line 335 to be moved such that stitching line 335 is aligned with a region of decreased interest to the driver or a region where an object, like another vehicle, is not or is least likely to be present under the conditions of the input signal. For example, stitching line 335 may be moved inward as speed increases and vice versa. As another example, stitching line 335 may be moved inward when an object is detected by a blind spot detector.

As used herein, the terms "vertical," "horizontal," "forward" and "rearward" relate to perspective directions when the disclosed systems are disposed on a vehicle under normal operating conditions.

In this document, relational terms, such as "first," "second," "third," and the like, are used solely to distinguish one entity or action from another entity or action, without necessarily requiring or implying any actual such relationship or order between such entities or actions.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; A and C in combination; B and C in combination; or A, B, and C in combination.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:
1. A system comprising:
an imager disposed on a vehicle and operable to capture a first video stream of a scene exterior the vehicle, the first video stream having a first field of view;

an input device operable to provide an input signal corresponding to a speed of the vehicle;

a controller operable to:
receive the first video stream,
receive the input signal corresponding to the speed of the vehicle, and
produce a second video stream cropped from the first video stream, the second video stream having a second field of view based, at least in part, on the speed of the vehicle, the second field of view different than the first field of view, wherein the second field of view narrows with increasing vehicle speed; and a display operable to receive and display the second video stream;

wherein the controller is further operable to receive a manual over-ride for the production of the second video stream being based, at least in part, on the vehicle's speed.

2. The system of claim 1, wherein the scene is rearward relative to the vehicle.

3. The system of claim 1, wherein the input device is at least one of a vehicle speed detector, a transmission, and an auxiliary imager.

4. The system of claim 1, wherein the manual override corresponds to manually selecting a horizontal angle of the second field of view.

5. The system of claim 1, wherein:
the first field of view has a first vertical pitch;
the second field of view has a second vertical pitch; and
the first and second fields of view are different with respect, at least in part, to the first and second vertical pitches.

6. The system of claim 5, wherein: the input signal also corresponds to the vehicle's direction of travel.

7. The system of claim 1, wherein:
the first field of view has a first horizontal yaw;
the second field of view has a second horizontal yaw; and
the first and second fields of view are different with respect, at least in part, to the first and second horizontal yaws.

8. The system of claim 1, wherein:
the first field of view has a first horizontal field of view angle;
the second field of view has a second horizontal field of view angle; and
the first and second fields of view are different with respect, at least in part, to the first and second horizontal field of view angles.

9. The system of claim 1, wherein:
the controller is further operable to obscure at least part of a periphery of the first field of view; and
the second field of view is defined based, at least in part, by the obscured portion of the periphery.

10. A device comprising:
a display operable to display a composite video stream; and
an input device operable to provide an input signal, wherein the input device is at least one of a vehicle speed detector, a blind spot detector, a transmission, a gear selector, and an auxiliary imager;

a controller operable to:
receive:
a first video stream having a first field of view rearward relative a vehicle,
a second video stream having a second field of view, wherein the second field of view overlaps with the first field of view to define a first overlapping region, and
the input signal,
produce the composite video stream by:
cropping at least one of the first and second video streams along a first stitch line in the first overlapping region, and
disposing the first and second video streams adjacent one another in abutting contact;
wherein a location of the first stitch line within the first overlapping region is based, at least in part, on the input signal.

11. The device of claim 10, wherein the input signal corresponds to at least one of an object detection and a vehicle speed.

12. The device of claim 10, wherein the controller is further operable to:
receive a third video steam having a third field of view, wherein the third field of view overlaps with the first field of view to define a second overlapping region; and
produce the composite video steam by:
cropping at least one of the first, second, and third video streams along the first stitch line and along a second stitch line in the second overlapping region, and disposing the first, second, and third video streams adjacent one another in abutting contact, wherein the location of the second stitch line within the second overlapping region is based, at least in part, on the input signal.

13. A system comprising:
an imager disposed on a vehicle and operable to capture a first video stream of a scene exterior a vehicle;
a controller operable to:
receive the first video stream,
an input signal from an input device, wherein the input device is at least one of a vehicle speed detector, a blind spot detector, a transmission, a gear selector, and an auxiliary imager; and
produce a second video stream based, at least in part, on applying a warp to the first video stream, the warp being at least one of a compression and a stretch of a region of the second video stream relative the first video stream, wherein the warp is based, at least in part, on the input signal; and
a display operable to receive and display the second video stream.

14. The system of claim 13, wherein the warp is an aspherical warp.

15. The system of claim 13, wherein the input signal corresponds to an object detected in a blind spot of the vehicle.

16. The system of claim 13, wherein the warp is operable to better focus the field of view of the second video stream on the detected object.

17. The system of claim 3, wherein the input device is a speed detector.

* * * * *